(12) United States Patent
Idei et al.

(10) Patent No.: US 8,036,076 B2
(45) Date of Patent: Oct. 11, 2011

(54) METHOD OF REDUCING STORAGE POWER CONSUMPTION BY USE OF PREFETCH AND COMPUTER SYSTEM USING THE SAME

(75) Inventors: Hideomi Idei, Kawasaki (JP); Kazuhiko Mogi, Sagamihara (JP); Norifumi Nishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 682 days.

(21) Appl. No.: 12/007,936

(22) Filed: Jan. 17, 2008

(65) Prior Publication Data

US 2009/0112894 A1 Apr. 30, 2009

(30) Foreign Application Priority Data

Oct. 24, 2007 (JP) ................................ 2007-276132

(51) Int. Cl.
*G11B 17/00* (2006.01)
*G06F 7/00* (2006.01)

(52) U.S. Cl. ................. 369/47.36; 369/47.1; 369/47.45; 360/46; 360/73.01; 360/73.03; 360/73.05; 360/73.06; 360/73.07; 360/73.08; 711/114; 710/8; 710/15; 710/19; 710/62; 710/65; 707/608; 707/705; 707/713; 707/719; 707/720

(58) Field of Classification Search ........................ None
See application file for complete search history.

(56) References Cited

U.S. PATENT DOCUMENTS

| | | | | |
|---|---|---|---|---|
| 6,006,289 A | * | 12/1999 | James et al. | 710/35 |
| 6,633,891 B1 | * | 10/2003 | Bamford et al. | 1/1 |
| 7,139,768 B1 | * | 11/2006 | Janzig et al. | 1/1 |
| 7,143,203 B1 | * | 11/2006 | Altmejd | 710/16 |
| 7,676,516 B2 | * | 3/2010 | Boukobza | 707/713 |
| 2003/0072225 A1 | * | 4/2003 | Tada | 369/44.29 |

(Continued)

FOREIGN PATENT DOCUMENTS

GB 2266388 A * 10/1993

(Continued)

OTHER PUBLICATIONS

Sudhanva Gurumurthi et al., "DRPM: Dynamic Speed Control for Power Management in Server Class Disks", ACM SIGARCH Computer Architecture News, Proceedings of the 30th annual international symposium on computer architecture ISCA '03, vol. 31, Issue 2.

*Primary Examiner* — Henry Tsai
*Assistant Examiner* — Steven Snyder
(74) *Attorney, Agent, or Firm* — Volpe and Koenig, P.C.

(57) ABSTRACT

Provided is a computer system including: a computer running as a DB server; a storage system including a plurality of disk drives for storing data; and a management module, in which: at least one of the plurality of disk drives stores data of a DB schema written by the computer; the management module specifies the DB schema to be accessed based on a received query, transmits, to the storage system, an instruction to copy at least a portion of the data of the specified DB schema from the disk drive to a memory, and transmits, to the storage system, an instruction to control an rpm of the disk drive that stores the data of the specified DB schema; and the storage system controls the rpm of the disk drive based on the instruction. Accordingly, power consumption of the storage system can be reduced even if installed disks increase in number.

9 Claims, 12 Drawing Sheets

U.S. PATENT DOCUMENTS

| | | | |
|---|---|---|---|
| 2004/0054648 A1* | 3/2004 | Mogi et al. | 707/1 |
| 2005/0174678 A1* | 8/2005 | Zayas et al. | 360/73.03 |
| 2005/0203863 A1 | 9/2005 | Idei et al. | 1/1 |
| 2005/0259345 A1 | 11/2005 | Hakamata et al. | 360/69 |
| 2006/0112252 A1* | 5/2006 | Dixon | 711/170 |
| 2007/0067337 A1* | 3/2007 | Morris et al. | 707/103 R |
| 2007/0174290 A1* | 7/2007 | Narang et al. | 707/10 |
| 2007/0250475 A1* | 10/2007 | Idei et al. | 707/2 |
| 2008/0082743 A1* | 4/2008 | Hanebutte et al. | 711/113 |
| 2008/0172424 A1* | 7/2008 | Kawamura | 707/204 |
| 2010/0153640 A1* | 6/2010 | Jagadish et al. | 711/114 |

FOREIGN PATENT DOCUMENTS

| | | |
|---|---|---|
| JP | 2000-293314 | 4/1999 |
| JP | 2001222380 A * | 8/2001 |
| JP | 2005-258735 | 3/2004 |

* cited by examiner

| RAW DEVICE FILE NAME | STORAGE SYSTEM ADDRESS | LOGICAL UNIT NUMBER | HEAD LOGICAL BLOCK ADDRESS | NUMBER OF LOGICAL BLOCKS |
|---|---|---|---|---|
| /dev/rdsk/raw1 | 1000 | 0 | 0 | 67108864 |
| /dev/rdsk/raw2 | 1000 | 1 | 0 | 33554432 |
| /dev/rdsk/raw3 | 1000 | 2 | 0 | 33554432 |
| ⋮ | ⋮ | ⋮ | ⋮ | ⋮ |

RAW DEVICE INFORMATION

*FIG. 3*

|  422 | 424 | 426 | 428 |
|---|---|---|---|
| DATA AREA ID | DATA AREA NAME | DB SYSTEM FILE NAME | AREA SIZE |
| 0 | DB1 | /DB/DATA1.dat | 40GB |
| 1 | DB2 | /DB/DATA2.dat | 10GB |
| 2 | LOG1 | /DB/DATA3.dat | 500MB |
| ⋮ | ⋮ | ⋮ | ⋮ |

DATA AREA INFORMATION ~420

FIG. 4C

| 442 | 444 | 446 | 448 | 450 | 452 |
|---|---|---|---|---|---|
| SCHEMA ID | SCHEMA NAME | SCHEMA TYPE | DATA AREA ID | SCHEMA SIZE | LOCATION HEAD OFFSET |
| 0 | T1 | TABLE | 0 | 4GB | 128 |
| 1 | T2 | TABLE | 0 | 2GB | 8388608 |
| 2 | I2 | INDEX | 1 | 500MB | 128 |
| ⋮ | ⋮ | ⋮ | ⋮ | ⋮ | ⋮ |

DB SCHEMA INFORMATION ~440

FIG. 4D

| SCHEMA ID | DBMS ID | SCHEMA TYPE | SCHEMA SIZE | LOCATION DESTINATION STORAGE SYSTEM ADDRESS | LOCATION DESTINATION LOGICAL UNIT NUMBER | LOCATION DESTINATION HEAD LOGICAL ADDRESS |
|---|---|---|---|---|---|---|
| 0 | 12 | TABLE | 4GB | 1000 | 0 | 128 |
| 1 | 12 | TABLE | 2GB | 1000 | 0 | 8388608 |
| 2 | 12 | INDEX | 500MB | 1000 | 0 | 128 |
| ⋮ | ⋮ | ⋮ | ⋮ | ⋮ | ⋮ | ⋮ |

DB SCHEMA LOCATION INFORMATION

METHOD OF REDUCING STORAGE POWER CONSUMPTION BY USE OF PREFETCH AND COMPUTER SYSTEM USING THE SAME

CLAIM OF PRIORITY

The present application claims priority from Japanese application JP2007-276132 filed on Oct. 24, 2007, the content of which is hereby incorporated by reference into this application.

BACKGROUND

A technology disclosed herein relates to a computer system for operating a database (hereinafter, referred to as "DB") and a storage system for storing data of the DB, in particular, a technique of reducing power consumption of a storage system.

There currently exist many different applications based on a DB, which makes it extremely important to employ a database management system (hereinafter, referred to as "DBMS") for performing a series of processing/management involving the DB. One of the characteristics of the DB is handling an enormous amount of data. Therefore, in general, many computer systems in which a DBMS operates (hereinafter, referred to as "DB systems") have such a system configuration that a computer on which a DBMS (hereinafter, referred to as "DB server") runs is coupled to a storage system including a plurality of disk drives (in other words, having a large capacity) to store data of the DB in the storage system.

The data of the DB managed by the DBMS tends to be increasing year by year, which further increases in capacity of the storage system. As one of methods of increasing the capacity of a storage system, there is a method of increasing the number of installed disks. The increase in the number of installed disks leads to an increase in storage area, but the rotations of the disks consume more power. Therefore, the increase in the number of disks raises a problem in that power consumption of the entire storage system becomes larger. JP 2000-293314 A is known as an example of a technique for reducing the power consumption of the storage system.

JP 2000-293314 A discloses a technique of controlling power-saving conditions of disk drives (in other words, powering on/off and selection of a power-saving mode) if a disk array system does not receive an access request from a host system within a predetermined time. Upon reception of the access request from the host system, the disk array system turns on power of a disk drive to be accessed if the power thereof is off, and then executes the access.

From the viewpoint of a single disk (hard disk drive), the power consumption relates to an rpm of the disk. To be specific, the lower the rpm is, the lower the power consumption is, while the higher the rpm is, the higher the power consumption is. "ACM SIGARCH Computer Architecture News, Proceedings of the 30th annual international symposium on Computer architecture ISCA '03, Volume 31 Issue 2" discloses a technique of the disk capable of dynamically changing the rpm. According to this technique, it is possible to control the power consumption by setting the rpm of the disk to be low.

JP 2005-258735 A discloses a technique of improving performance of the DB system by causing the DBMS to read out data to be accessed from the disk of the storage system in advance based on a query plan created by the DBMS upon execution of a query, and to write the data into a cache memory. Such processing of reading data to be accessed from the disk in advance and holding the data in a memory is called "prefetch".

SUMMARY

As described above, in the storage system for storing data of the DB managed by the DBMS, the increase in power consumption follows the increase in storage area (in other words, increase in the number of disks). This creates a demand for a technique for reducing the power consumption of the storage system.

As the technique for reducing the power consumption of the storage system, the technique disclosed in JP 2000-293314 A can be used. For example, the reduction of the power consumption can be realized by turning off the power of a disk drive if there is no access request thereto within a predetermined time, and turning on the power of a disk drive to be accessed if there is an access request thereto. However, in this technique, upon reception of the access request (in other words, I/O request) from the host system (for example, computer coupled to the storage system), the storage system turns on the power of the disk drive to be accessed, and then executes the data access. This raises a problem in that the response to the I/O with respect to the host system delays.

To solve the problem, the technique disclosed in JP 2000-293314 A may be combined with the technique disclosed in "ACM SIGARCH Computer Architecture News, Proceedings of the 30th annual international symposium on Computer architecture ISCA '03, Volume 31 Issue 2". To be specific, if there is no access within a predetermined time, the rotation of the disk of the storage system is set to "low" to thereby reduce the power consumption. If the I/O request is made by the host system, the rotation of the disk is set to "high (normal)" to thereby speed up the response to the I/O with respect to the host system compared with the above-mentioned delayed timing. In this case, the disk is rotated at high speed, which increases the power consumption of the storage system. On the other hand, the rotation of the disk may be kept low. In this case, the power consumption is reduced, but a data transfer amount per unit time becomes smaller, resulting in the delay of the response to the I/O with respect to the host system. For example, if the storage system must satisfy predetermined performance requirements, the operation with the disk rotating at high speed is highly possible in more situations eventually. In this case, the reduction of the power consumption of the storage system is hardly expected.

An object of this invention is to provide a technique of reducing power consumption of a storage system by setting rotation of a disk within the storage system which stores data of a DB to be as low as possible within predetermined performance requirements while maintaining its performance by use of prefetch.

According to a representative invention disclosed in this application, there is provided a computer system comprising a computer and a storage system coupled to the computer via a network, the computer comprising: a first interface coupled to the network; a first processor coupled to the first interface; and a first memory coupled to the first processor, the computer running as a database server by executing a database management system stored in the first memory by the first processor, the storage system comprising: a plurality of disk drives for storing data written by the computer; and a controller for controlling the plurality of disk drives, the controller comprising: a second interface coupled to the network; a second processor coupled to the second interface; and a second memory coupled to the second processor, at least one of the plurality of disk drives storing data of a database schema written by the computer, the computer system further comprising a management module, wherein: the management module is configured to: specify the database schema to be accessed based on a query received by the computer; read out at least a portion of the data of the specified database schema from the disk drive, and transmit an instruction to write the read out data into the second memory to the storage system; and transmit, to the storage system, a control instruction for controlling an rpm of the disk drive that stores the data of the specified database schema; and the controller is configured to specify the disk drive whose rpm is to be controlled according to the control instruction, and execute one of lowering of the rpm of the specified disk drive and stopping of rotation of the specified disk drive.

According to one embodiment of this invention, it is possible to reduce the power consumption of the storage system by setting the rotation of the disk within the storage system which stores the data of the DB to be as low as possible.

BRIEF DESCRIPTION OF THE DRAWINGS

FIG. 3 is an explanatory diagram showing an example of a structure of raw device information held by an OS of a DB server according to the embodiment of this invention.

FIG. 4C is an explanatory diagram showing an example of a structure of data area information according to the embodiment of this invention.

FIG. 4D is an explanatory diagram showing an example of a structure of DB schema information according to the embodiment of this invention.

DETAILED DESCRIPTION OF THE PREFERRED EMBODIMENTS

Hereinafter, description will be made of an embodiment of this invention. It should be noted that this invention is not limited thereto.

Figure 1:
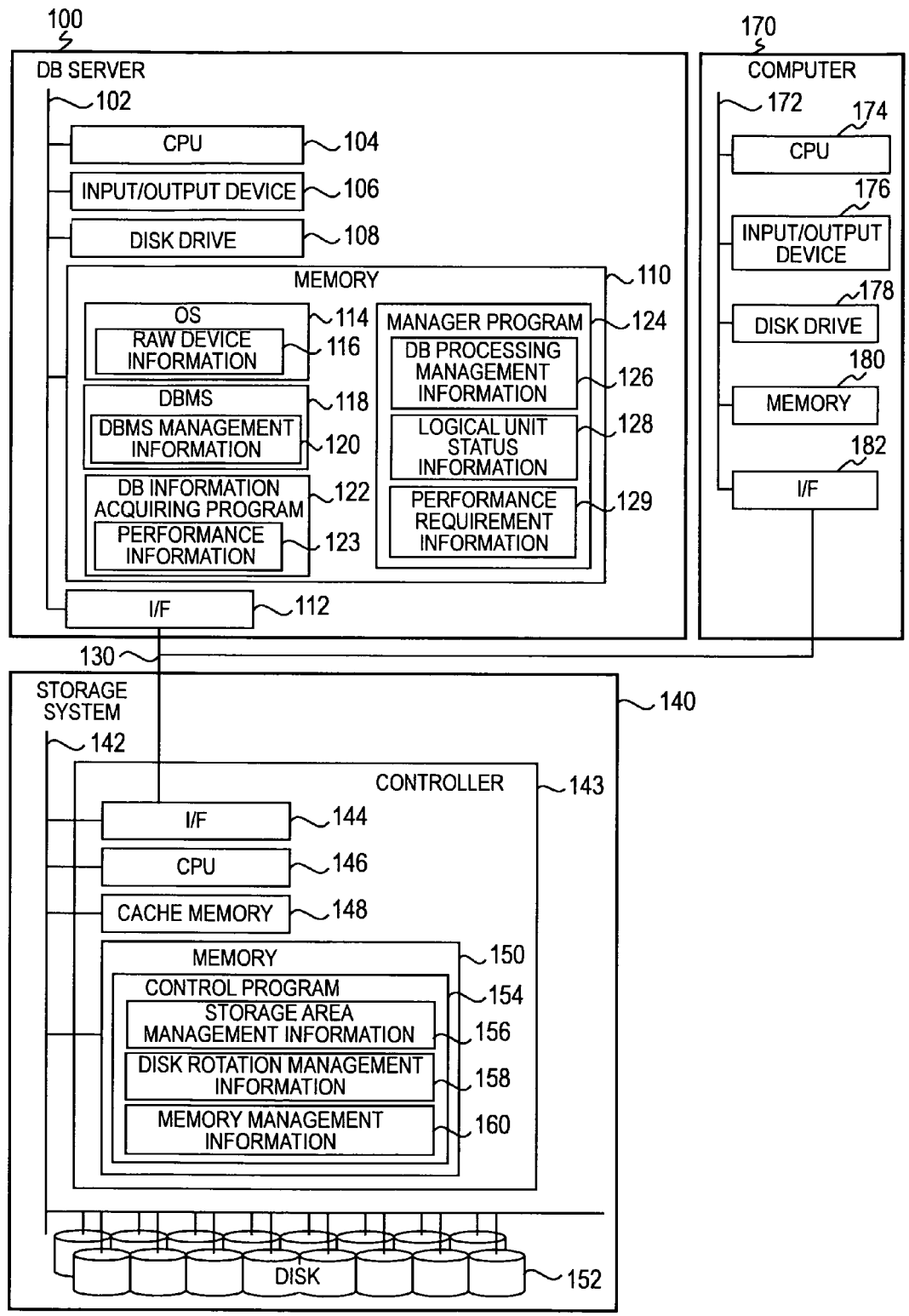
FIG. 1 is a block diagram illustrating a configuration of a DB system according to an embodiment of this invention.

FIG. 1 is a block diagram illustrating a configuration of a DB system according to the embodiment of this invention.

In the DB system (in other words, a computer system shown in FIG. 1) of this embodiment, a DB server 100 and a storage system 140 are coupled to each other via a communication network 130. The DB server 100 executes a DBMS 118 for managing a DB stored in the storage system 140. The storage system 140 stores data of the DB and the like which is used by the DB server 100. The communication network 130 may be a network such as a local area network (LAN) or a wide area network (WAN), or may be a network (storage area network: SAN) constituted by a Fibre channel or the like.

It should be noted that FIG. 1 illustrates only one DB server 100 and one storage system 140, but the computer system of this embodiment may include a plurality of DB servers 100 and a plurality of storage systems 140. In addition, the communication network 130 may be coupled with a computer 170. The computer 170 may be, for example, a DB server of the same type as the DB server 100 or a client computer which uses the DB server 100.

The DB server 100 may be, for example, a general computer. To be specific, for example, the DB server 100 includes a CPU (control processor) 104, an input/output device 106, a disk drive 108, a memory 110, and an I/F 112 (in other words, interface coupled to the communication network 130), which are coupled to one another through an internal bus 102. At least one of the memory 110 and the disk drive 108 stores an operating system (hereinafter, referred to as "OS") 114, the DBMS 118, a DB information acquiring program 122, and a manager program 124.

The OS 114, the DBMS 118, the DB information acquiring program 122, and the manager program 124 are executed by the CPU 104.

The OS 114 holds raw device information 116 indicating a correspondence between a raw device and a logical storage area of the storage system 140. It should be noted that the raw device represents the unit of a logical disk drive managed by the OS 114.

The DBMS 118 holds DBMS management information 120 necessary for managing the operation of the DB. The DBMS 118 receives a query from an application (not shown), creates a query plan of the received query, and executes processing according to the query plan. If the processing needs access to data stored in the storage system 140, the DBMS 118 issues a request to access the data (hereinafter, referred to also as "I/O request") to the storage system 140.

The DB information acquiring program 122 acquires various information on the DB, and executes processing of transmitting the information to the manager program 124. The DB information acquiring program 122 also monitors the performance of the DB server 100, and transmits information on the performance as well to the manager program 124.

The manager program 124 holds DB processing management information 126 necessary for prefetch processing described in JP 2005-258735 A, logical unit status information 128 relating to a control status of each logical unit, and performance requirement information 129 that is set by an administrator. It should be noted that in this embodiment, performance requirements set by the administrator, and the performance of the DB server 100 monitored by the DB information acquiring program 122 correspond to a response time of an I/O. However, instead of the response time, any index (for example, throughput or IOPS) that indicates a performance of the DB server 100 may be set or monitored.

The storage system 140 includes a plurality of disks 152 and a controller 143 coupled to those disks 152. The controller 143, for example, includes an I/F 144 (interface to the communication network 130), a CPU (control processor) 146, a cache memory 148, and a memory 150, which are coupled to one another through an internal bus 142.

The memory 150 stores a control program 154 for controlling the storage system 140. The control program 154 is executed by the CPU 146. The control program 154 includes storage area management information 156, disk rotation management information 158, and memory management information 160. The storage area management information 156 represents information for associating the logical storage area of the storage system 140 and a physical storage area included in the disk 152. The disk rotation management information 158 represents information for managing a rotation status of each disk 152. The memory management information 160 represents information for managing a use status of the memory 150.

The disk 152 represents, for example, a hard disk drive (magnetic disk drive). The storage system 140 may be configured by integrating a plurality of disks 152 into a redundant array of independent (or inexpensive) disks (RAID) structure. Hereinafter, the disk 152 may be referred to also as "physical disk".

It should be noted that the above-mentioned various programs may be installed in each device through the intermediation of a removable storage medium or a communication network.

If the storage system 140 receives a write request and data to be written based on the write request from the DB server 100, the control program 154 temporarily stores the received data in the cache memory 148, and then writes the data to the storage area of the corresponding disk 152. When the storage system 140 receives a read request, the control program 154 reads out the corresponding data (in other words, data to be read out based on the read request) from the cache memory 148, and transmits the data to the DB server 100. If there is no corresponding data in the cache memory 148, the control program 154 reads out the corresponding data from the disk 152 into the cache memory 148, and transmits the data to the DB server 100.

The description has been made above of the configuration of the DB system of this embodiment. It should be noted that in this embodiment, the manager program 124 runs on the DB server 100. However, the manager program 124 may run on another computer 170 coupled to the DB server 100 and the storage system 140.

The computer 170 includes a CPU 174, an input/output device 176, a disk drive 178, a memory 180, and an I/F 182, which are coupled to one another via an internal bus 172. If the manager program 124 runs on the computer 170, the manager program 124 is stored in the memory 180, and executed by the CPU 174.

Alternatively, the manager program 124 may run on the storage system 140. In that case, the manager program 124 is stored in the memory 150, and executed by the CPU 146.

Alternatively, the DB server 100 and the storage system 140 may be mounted to a single casing. To be specific, for example, the DB server 100 may be mounted as a so-called blade server to the controller 143 of the storage system 140 or a casing in which the disks 152 are mounted.

Next, hereinafter, description will be made of the above-mentioned various information.

Figure 2A:
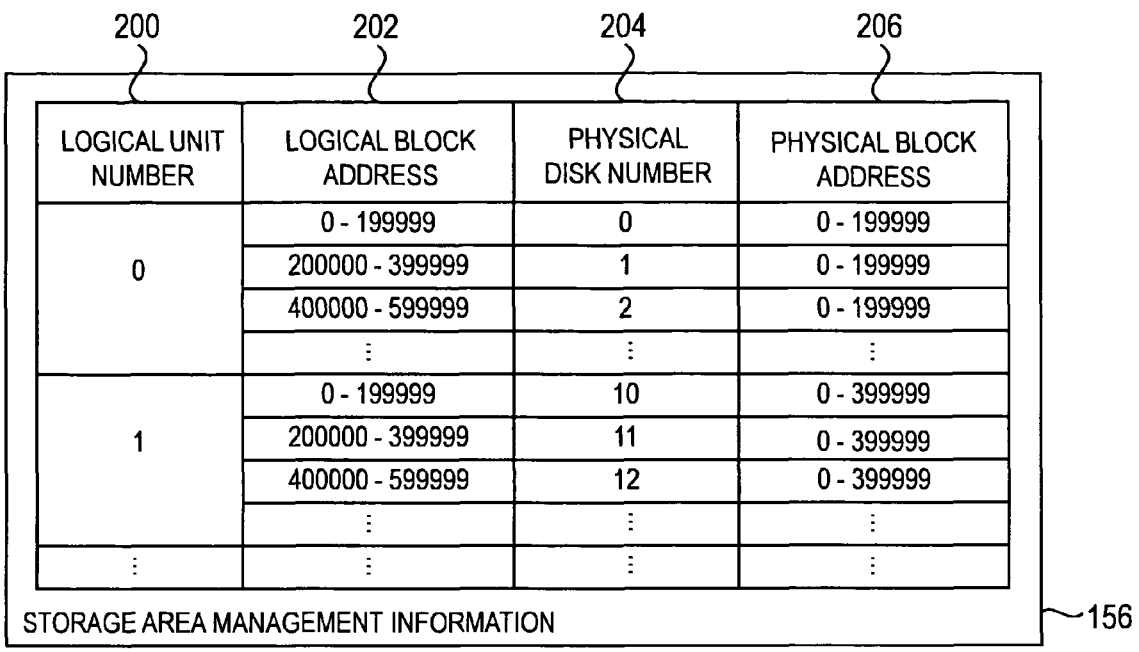
FIG. 2A is an explanatory diagram showing an example of a structure of storage area management information held by a control program of a storage system according to the embodiment of this invention.

FIG. 2A is an explanatory diagram showing an example of a structure of the storage area management information 156 held by the control program 154 of the storage system 140 according to the embodiment of this invention.

The storage area management information 156 represents information for associating the logical storage area (hereinafter, referred to as "logical unit") included in the storage system 140 with the physical storage area in which data is actually stored, and includes an entry corresponding to each logical unit. Each entry contains a field 200 for registering a logical unit number for identifying the logical unit, a field 202 for registering the number (hereinafter, referred to as "logical block address") of a logical block within the logical unit, a field 204 for registering a physical disk number for identifying the disk 152 to which a physical block corresponding to the logical block belongs, and a field 206 for registering the number (hereinafter, referred to as "physical block address") of the physical block corresponding to the logical block.

It should be noted that the term "block" represents the unit used for handling the storage area, often indicating 512 bytes in general. The logical blocks must correspond to the physical blocks on a one-to-one basis, but all of the logical blocks do not have to be present on a single disk 152.

The storage system 140 receives from the DB server 100 an access request in which the logical unit and the logical block address are designated. Then, based on the storage area management information 156, the storage system 140 identifies the physical disk number and physical block address of the physical block corresponding to the designated logical unit and logical block, and executes actual access to the physical block indicated by the identified address.

For example, referring to FIG. 2A, upon reception of an access request with the logical unit number designated as "0" and the logical block address designated as "200000", the storage system 140 executes access to the physical block identified by the physical block address "0" of the disk 152 identified by the physical disk number "1".

Figure 2B:
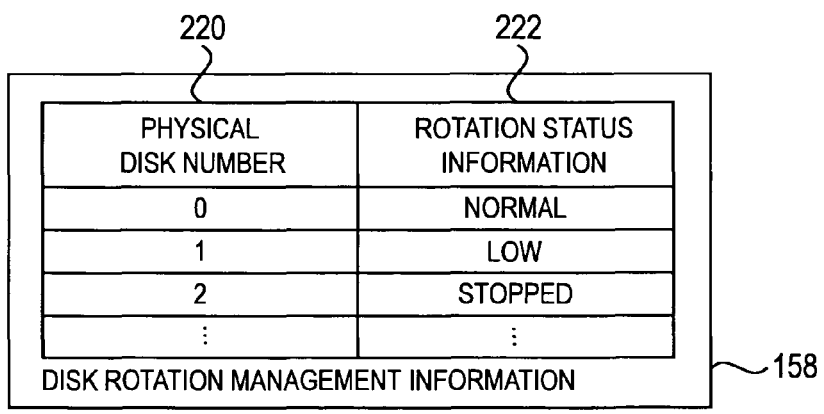
FIG. 2B is an explanatory diagram showing an example of a structure of disk rotation management information held by the control program of the storage system according to the embodiment of this invention.

FIG. 2B is an explanatory diagram showing an example of a structure of the disk rotation management information 158 held by the control program 154 of the storage system 140 according to the embodiment of this invention.

The disk rotation management information 158 represents information for managing the rotation statuses of the disks 152 included in the storage system 140 individually (in other words, on a physical disk basis), and has an entry corresponding to each physical disk. Each entry contains a field 220 for registering a physical disk number for identifying each disk 152, and a field 222 for registering information on a rotation status (for example, "normal", "low", or "stopped") of the physical disk.

It should be noted that in this example, the rotation status "normal" represents a status in which the disk 152 is rotating at a normal rpm. The rotation status "low" represents a status in which the disk 152 is rotating at an rpm lower than the rotation status "normal". The rotation status "stopped" represents a status in which the rotation of the disk 152 is stopped. Instead of the rotation statuses "normal" etc., the rpm of each disk 152 may be registered in the field 222.

In the example of FIG. 2B, "normal", "low", and "stopped" are registered as the rotation status information corresponding to the physical disk numbers "0", "1", and "2", respectively. This indicates that the disk 152 identified by the physical disk number "1" is rotating at an rpm lower than the disk 152 identified by the physical disk number "0", and that the rotation of the disk 152 identified by the physical disk number "2" is stopped.

Figure 2C:
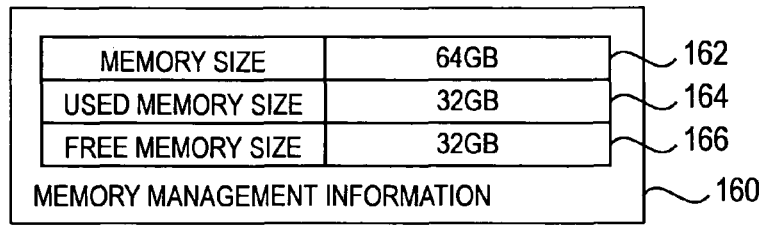
FIG. 2C is an explanatory diagram showing an example of a structure of memory management information held by the control program of the storage system according to the embodiment of this invention.

FIG. 2C is an explanatory diagram showing an example of a structure of the memory management information 160 held by the control program 154 of the storage system 140 according to the embodiment of this invention.

The memory management information 160 contains a field 162 for registering a memory size, a field 164 for registering a used memory size, and a field 166 for registering a free memory size.

Registered in the field 162 is a value representing the size of the memory 150, in other words, a total capacity of the memory 150. Registered in the field 164 is a value representing the size of an area that is currently in actual use within the entire storage area of the memory 150. Registered in the field 166 is a value representing the size of an area that is not currently in use within the entire storage area of the memory 150.

FIG. 3 is an explanatory diagram showing an example of a structure of the raw device information 116 held by the OS 114 of the DB server 100 according to the embodiment of this invention.

The raw device information 116 is information for associating the raw device included in the OS 114 with the storage area on the storage system 140 which is allocated to the raw device. The raw device information 116 includes an entry corresponding to each raw device. Each entry contains a field 300 for registering a file name of the raw device, a field 302 for registering a storage system address of the storage system 140 to which the storage area allocated to the raw device belongs, a field 304 for registering the logical unit number of the logical unit to which the allocated storage area belongs, a field 306 for registering a head logical block address on the logical unit of the allocated storage area, and a field 308 for registering the number of logical blocks of the allocated storage area.

For example, referring to FIG. 3, the raw device identified by the file name "/dev/rdsk/raw1" is allocated with 67108864 logical blocks starting with the head logical block address "0" of the logical unit identified by the logical unit number "0" within the storage system 140 identified by the storage system number "1000".

Figure 4A:
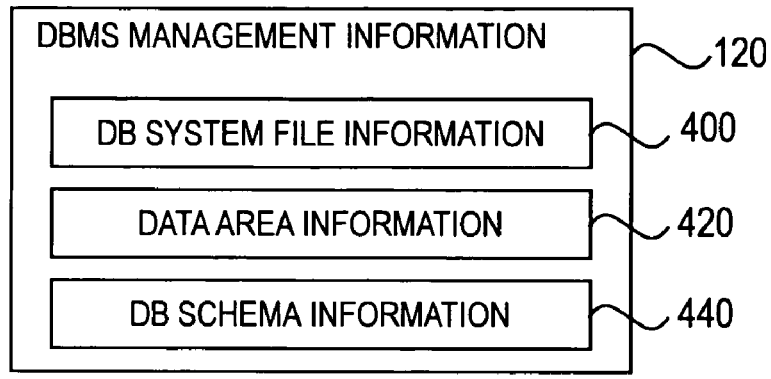
FIG. 4A is an explanatory diagram showing an example of a structure of DBMS management information held by a DBMS according to the embodiment of this invention.

FIG. 4A is an explanatory diagram showing an example of a structure of the DBMS management information 120 held by the DBMS 118 according to the embodiment of this invention.

The DBMS management information 120 is set by an administrator or the like in initial setting of the DB or during the operation thereof.

The DBMS management information 120 contains DB system file information 400 serving as setting information for the DB system file, data area information 420 serving as setting information for a data area, and DB schema information 440 serving as setting information for a DB schema such as a table or an index.

Figure 4B:
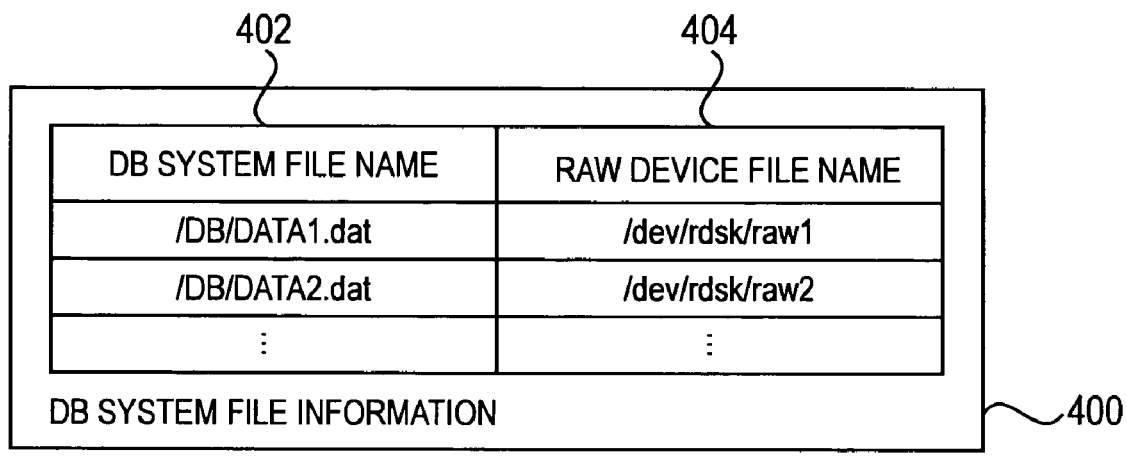
FIG. 4B is an explanatory diagram showing an example of a structure of DB system file information according to the embodiment of this invention.

FIG. 4B is an explanatory diagram showing an example of a structure of the DB system file information 400 according to the embodiment of this invention.

The DB system file information 400 represents information for associating the DB system file with the above-mentioned raw device. The DB system file information 400 includes an entry for each DB system file. Each entry contains a field 402 for registering the file name of the DB system file, and a field 404 for registering the file name of the raw device in which the DB system file is registered.

It should be noted that the DB system file represents a single large-size file created in the raw device. The DBMS 118 builds a DB by writing data of the DB into this DB system file. Further, with regard to the data of the DB written into the DB system file, the OS 114 references the above-mentioned raw device information 116 to identify the logical storage area of the storage system 140 into which the data is to be actually written. Based on the identified information, the OS 114 issues a data write command to the storage system 140. The similar processing is executed for data read.

FIG. 4C is an explanatory diagram showing an example of a structure of the data area information 420 according to the embodiment of this invention.

The data area information 420 represents the setting information for a data area managed by the DBMS 118. The data area information 420 includes an entry for each data area. Each entry contains a field 422 for registering a data area ID for identifying the data area, a field 424 for registering a name of the data area, a field 426 for registering the file name of the DB system file in which the data area is created, and a field 428 for registering an area size allocated to the data area. It should be noted that the data area represents a data area for storing data of the DB, and is created in the DB system file.

FIG. 4D is an explanatory diagram showing an example of a structure of the DB schema information 440 according to the embodiment of this invention.

The DB schema information 440 represents setting information relating to the DB schema such as a table or an index managed by the DBMS 118. The DB schema information 440 has an entry for each DB schema.

Each entry contains fields 442, 444, 446, 448, 450, and 452. Registered in the field 442 is a schema ID for identifying a DB schema. Registered in the field 444 is a schema name of the DB schema. Registered in the field 446 is a schema type (for example, "table" or "index") of the DB schema. Registered in the field 448 is a data area ID for identifying the data area into which the DB schema is written. Registered in the field 450 is a schema size of the DB schema. Registered in the field 452 is a location head offset in the data area into which the DB schema is written.

Figures 5A, 5B:
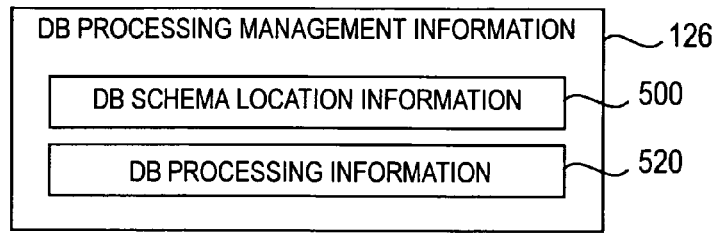
FIG. 5A is an explanatory diagram showing an example of a structure of DB processing management information held by a manager program according to the embodiment of this invention.
FIG. 5B is an explanatory diagram showing an example of a structure of DB schema location information according to the embodiment of this invention.

FIG. 5A is an explanatory diagram showing an example of a structure of the DB processing management information 126 held by the manager program 124 according to the embodiment of this invention.

The DB processing management information 126 contains DB schema location information 500 serving as logical location information of each DB schema, and DB processing information 520 serving as information on the DB processing.

It should be noted that the DB processing management information 126 is created based on the information acquired by the DB information acquiring program 122 from the DBMS 118 and the OS 114 and transmitted to the manager program 124.

FIG. 5B is an explanatory diagram showing an example of a structure of the DB schema location information 500 according to the embodiment of this invention.

The DB schema location information 500 represents information indicating an actual location at which the above-mentioned DB schema is stored in the storage area of the storage system 140. The DB schema location information 500 includes an entry for each DB schema. Each entry contains a field 502, 504, 506, 508, 510, 512, and 514.

Registered in the field 502 is a schema ID for identifying the DB schema. Registered in the field 504 is a DBMS ID for identifying the DBMS including the DB schema. The DBMS ID represents a unique value assigned to each DBMS in advance by the administrator or the like. Registered in the field 506 is the type of DB schema. Registered in the field 508 is the size of the DB schema. Registered in the field 510 is the storage system address of the storage system 140 into which the DB schema is written. Registered in the field 512 is the logical unit number assigned to the logical unit of the storage system 140 into which the DB schema is written. Registered in the field 514 is the head logical block address of the area within the logical unit into which the DB schema is written.

Figure 5C:
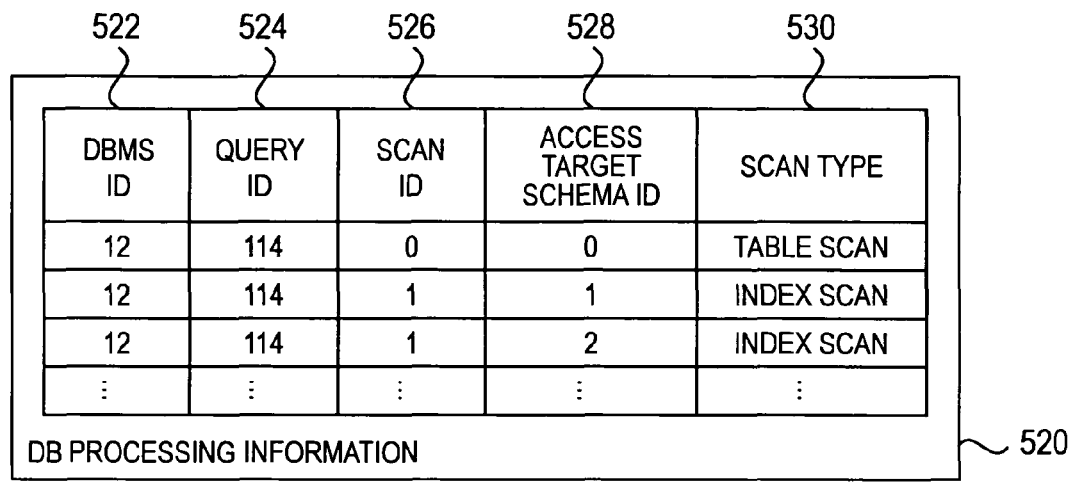
FIG. 5C is an explanatory diagram showing an example of a structure of DB processing information according to the embodiment of this invention.

FIG. 5C is an explanatory diagram showing an example of a structure of the DB processing information 520 according to the embodiment of this invention.

The DB processing information 520 represents information relating to a query executed by the DBMS and a search (such as table scan or index scan; hereinafter, referred to also as "scan") executed within the query. The DB processing information 520 includes an entry for each step of the query.

Each entry contains fields 522, 524, 526, 528, and 530. Registered in the field 522 is the DBMS ID for identifying the DBMS that executes the query. Registered in the field 524 is a query ID for identifying the query to be executed. Registered in the field 526 is a scan ID for identifying the scan to be executed within the query. It should be noted that the scan ID is assigned by the DBMS to uniquely identify the scan to be executed within the query. The scans are executed in order from the scan having a smaller value of the scan ID. Registered in the field 528 is a DB schema ID for identifying the DB schema to be accessed during the scan executed within the query. Registered in the field 530 is the type of scan.

Figure 5D:
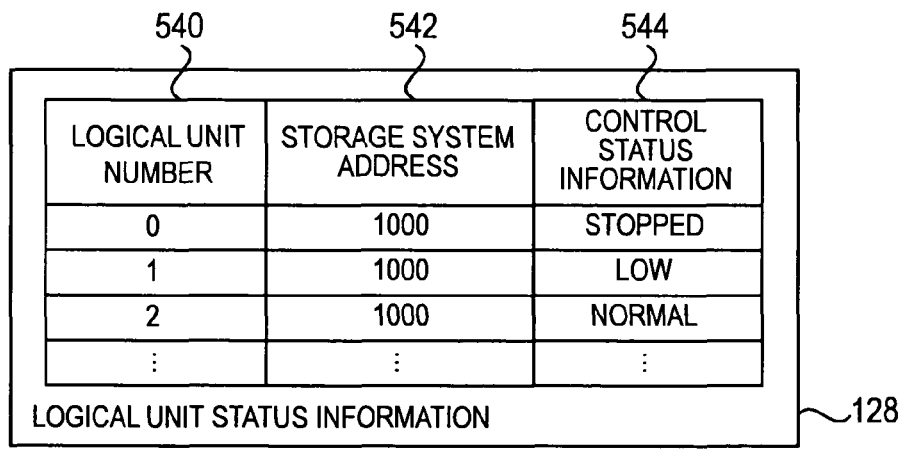
FIG. 5D is an explanatory diagram showing an example of a structure of logical unit status information held by the manager program according to the embodiment of this invention.

FIG. 5D is an explanatory diagram showing an example of a structure of the logical unit status information 128 held by the manager program 124 according to the embodiment of this invention.

The logical unit status information 128 represents information which indicates which control the manager program 124 is executing on the logical unit. The logical unit status information 128 includes an entry for each logical unit. Each entry contains a field 540 for registering a logical unit number, a field 542 for registering an address of the storage system 140 to which the logical unit belongs, and a field 544 for registering information relating to a current control status of the logical unit.

To be more specific, the information relating to the control of rotation of the disk 152 corresponding to the logical unit is registered in the field 544. In the example of FIG. 5D, the rotation statuses "stopped", "low", and "normal" are registered in the fields 544 corresponding to the logical unit numbers "0", "1", and "2", respectively. This indicates such control that the rotation of the disk 152 allocated to the logical unit identified by the logical unit number "0" is stopped, the disk 152 allocated to the logical unit identified by the logical unit number "1" is rotating at a low rpm, and the disk 152 allocated to the logical unit identified by the logical unit number "2" is rotating at a normal rpm. In this case, the meanings of the rotation statuses "stopped", "low", and "normal" are as described with reference to FIG. 2B.

Figure 6A:
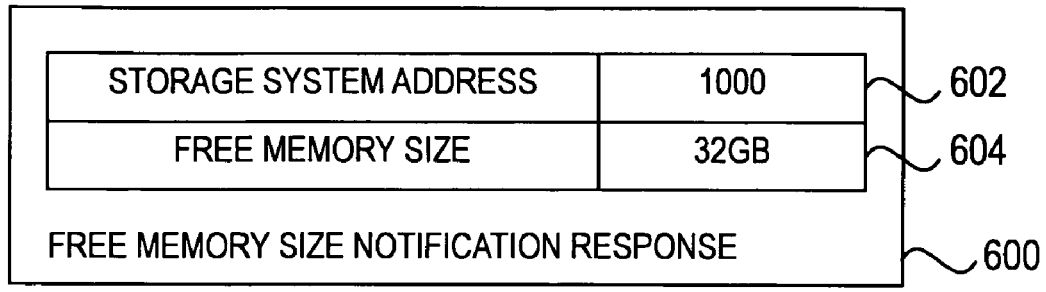
FIG. 6A is an explanatory diagram showing an example of a structure of a free memory size notification response according to the embodiment of this invention.

FIG. 6A is an explanatory diagram showing an example of a structure of a free memory size notification response 600 according to the embodiment of this invention.

The free memory size notification response 600 represents a response transmitted by the storage system 140 with respect to the free memory size notification command which has been issued to the storage system 140 by the manager program 124.

The free memory size notification response 600 contains a field 602 for registering the corresponding storage system address, and a field 604 for registering a free memory size. Upon reception of a free memory size notification command from the manager program 124, the control program 154 of the storage system 140 references the memory management information 160 held therein to set the storage system address of the own storage system 140 and the current free memory size (in other words, value of the field 166) in the fields 602 and 604 of the free memory size notification response 600, and returns the free memory size notification response 600 to the manager program 124.

Figure 6B:
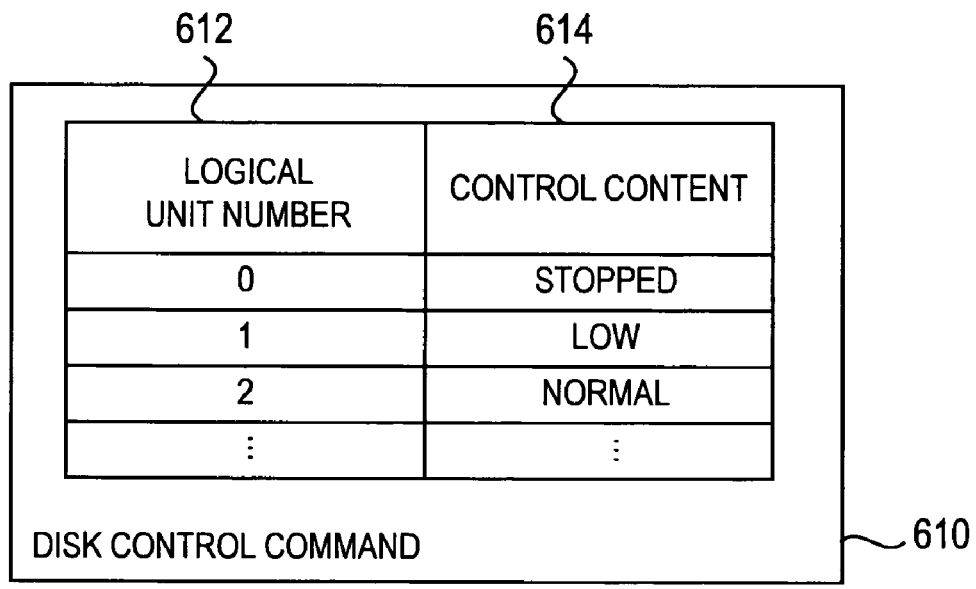
FIG. 6B is an explanatory diagram showing an example of a structure of a disk control command issued to the storage system by the manager program according to the embodiment of this invention.

FIG. 6B is an explanatory diagram showing an example of a structure of a disk control command 610 issued to the storage system 140 by the manager program 124 according to the embodiment of this invention.

The disk control command 610 contains a field 612 for registering the logical unit number of the logical unit to be controlled, and a field 614 for registering a content of the control. The manager program 124 controls the rotation of the disk 152 of the storage system 140 by issuing the disk control command 610 as necessary.

Upon reception of the disk control command 610, the control program 154 of the storage system 140 references the storage area management information 156 to identify the physical disk 152 corresponding to the logical unit, and executes the instructed control. At this time, the control program 154 updates the disk rotation management information 158 according to the received disk control command 610.

It should be noted that according to this embodiment, the disk control command 610 allows the rotation of the disk of the logical unit to be controlled in the three phases of the normal speed rotation, the low speed rotation, and the stopped state. However, the control may be executed in more phases, or in two phases (for example, the normal speed rotation and the low speed rotation, or the normal speed rotation and the stopped state). In this embodiment, the rpm of the disk 152 is, for example, 15000 rpm for the setting of the normal speed rotation and 5400 rpm for the setting of the low speed rotation.

Figure 6C:
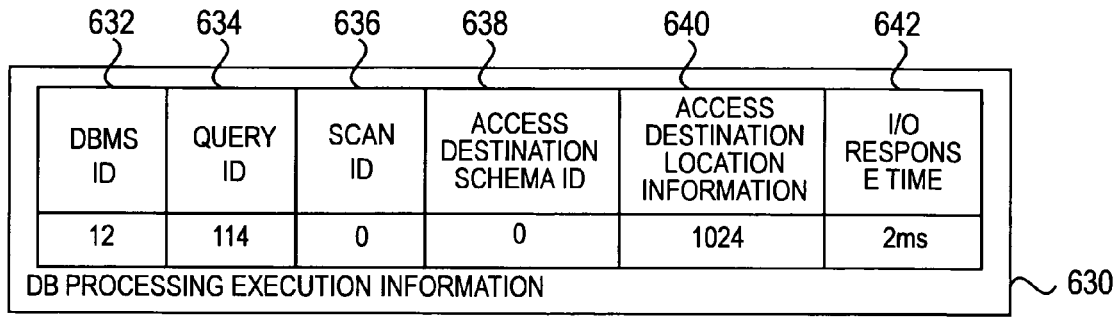
FIG. 6C is an explanatory diagram showing an example of a structure of DB processing execution information transmitted to the manager program by a DB information acquiring program according to the embodiment of this invention.

FIG. 6C is an explanatory diagram showing an example of a structure of DB processing execution information 630 transmitted to the manager program 124 by the DB information acquiring program 122 according to the embodiment of this invention.

The DB processing execution information 630 is created by the DB information acquiring program 122 when the DBMS 118 issues an access request with respect to the DB data on the storage system 140 based on the query plan for executing the query, and transmitted to the manager program

124. The DB processing execution information 630 contains fields 632, 634, 636, 638, 640, and 642.

Registered in the field 632 is the DBMS ID (identification) of the DBMS that executes the query being an access request source. Registered in the field 634 is the query ID of the query serving as the access request source. Registered in the field 636 is the scan ID of a scan within the query of the access request source. Registered in the field 638 is an access destination schema ID of a schema which is to be designated as an access destination in an access request to be issued. Registered in the field 640 is an access destination location information (in other words, logical block address) which indicates a location to be designated as the access destination in an access request to be issued. Registered in the field 642 is a current I/O response time. The I/O response time represents information based on performance information 123 which is held by and inside the DB information acquiring program 122 for monitoring I/Os of the DB server 100.

Figure 6D:
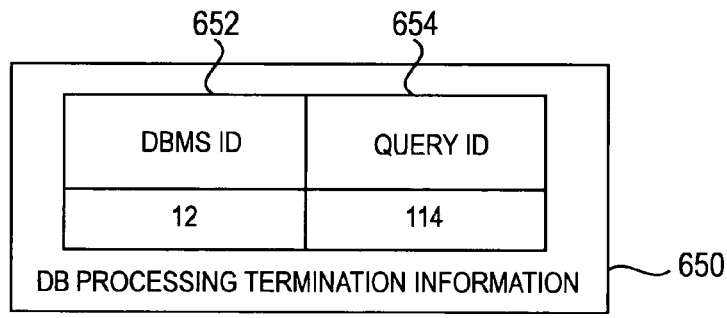
FIG. 6D is an explanatory diagram showing an example of a structure of DB processing termination information according to the embodiment of this invention.

FIG. 6D is an explanatory diagram showing an example of a structure of DB processing termination information 650 according to the embodiment of this invention.

For the DBMS 118 to terminate the query, the DB processing termination information 650 is transmitted to the manager program 124 by the DB information acquiring program 122.

The DB processing termination information 650 contains a field 652 for registering the DBMS ID of the DBMS 118 that has executed the query to be terminated, and a field 654 for registering the query ID of the query to be terminated.

Next, description will be made of a processing (hereinafter, referred to as "DB information acquisition/transmission processing") executed by the DB information acquiring program 122 and a processing (hereinafter, referred to as "the power consumption reduction processing") executed by the manager program 124. It should be noted that the DB has already been built (in other words, the DB processing management information 126 has already been created). In addition, prefetch processing executed by the manager program 124 is described in JP 2005-258735 A, and therefore description thereof will be omitted.

Figure 7:
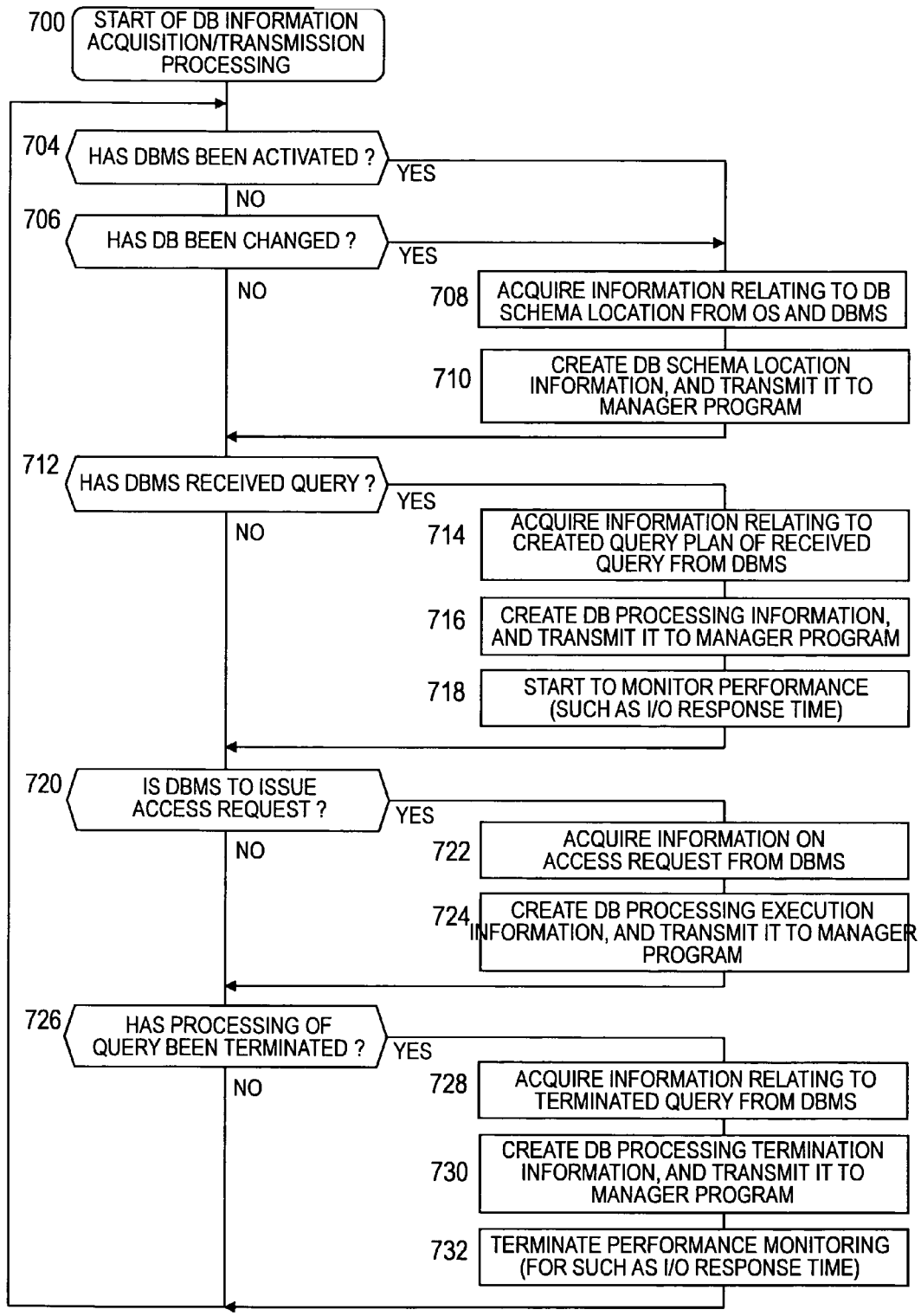
FIG. 7 is a flowchart showing an example of a procedure of a DB information acquisition/transmission processing according to the embodiment of this invention.

FIG. 7 is a flowchart showing an example of a procedure of the DB information acquisition/transmission processing according to the embodiment of this invention.

In the following description, a program being the subject of the sentence means that the CPU 104 or 146 that executes the program actually executes processing.

The system administrator activates the DB information acquiring program 122 on the DB server 100, and starts the DB information acquisition/transmission processing (Step 700).

First, the DB information acquiring program 122 judges whether or not the DBMS 118 has been activated (Step 704).

If it is judged that the DBMS 118 has not been activated, the DB information acquiring program 122 judges whether or not the DB has been changed (Step 706).

If the DBMS 118 has been activated (Yes in Step 704), or if the DB has been changed (Yes in Step 706), the DB information acquiring program 122 references the DBMS management information 120 held by the DBMS 118 and the raw device information 116 held by the OS 114 to acquire information relating to the DB schema (Step 708).

To be specific, for example, the schema ID, the schema type, and the data area ID are acquired from the DB schema information 440. Then, the DB system file name corresponding to the acquired data area ID is acquired from the data area information 420. Then, the raw device file name corresponding to the DB system file name is acquired from the DB system file information 400. Then, the storage system address and logical unit number corresponding to the acquired raw device file name are acquired from the raw device information 116.

The DB information acquiring program 122 creates the DB schema location information 500 containing the information acquired in Step 708 and the ID of the DBMS 118 holding the DBMS management information 120, and transmits the DB schema location information 500 to the manager program 124 (Step 710). The manager program 124, which has received the DB schema location information 500, holds the information therein. It should be noted that in a case where the DBMS 118 is running at the time of activation of the DB information acquiring program 122, the DB information acquiring program 122 executes Steps 708 and 710 immediately after the activation.

If it is judged in Step 706 that the DB has not been changed, or when Step 710 ends, the DB information acquiring program 122 judges whether or not the DBMS 118 has received the query (Step 712).

If the DBMS 118 has received the query (Yes in Step 712), the query plan is created by the DBMS 118. The DB information acquiring program 122 acquires information relating to the created query plan of the query from the DBMS 118 (Step 714), uses the information to create the DB processing information 520, and transmits the DB processing information 520 to the manager program 124 (Step 716).

Subsequently, the DB information acquiring program 122 starts to monitor the performance (in this embodiment, I/O response time), and holds therein the information as the performance information 123 (Step 718). To be specific, the DB information acquiring program 122 holds the information by, for example, providing the OS 114 with a hook to output the start time and end time of an I/O and acquiring the information through the hook to calculate the I/O response time based on the acquired information. It should be noted that holding all response times of I/Os requires a larger data amount, so the DB information acquiring program 122 may hold only a mean value of the I/O response times during a predetermined period or a mean value of the I/O response times of a predetermined number of I/Os as the performance information 123.

The processing advances to Step 720 after Step 718.

If it is judged in Step 712 that the DBMS 118 has not received the query, the processing advances to Step 720 without executing Steps 714, 716, and 718.

During the execution of the query (in other words, during the DB processing), for the DBMS 118 to access the data of the DB, the I/O request is issued from the DBMS 118 to the storage system 140 via the OS 114. The DB information acquiring program 122 judges whether or not the I/O request is to be issued by monitoring an I/O request issued from the DBMS 118 or inserting a hook into the DBMS 118 to notify the DB information acquiring program 122 when the I/O request is issued (Step 720).

When the I/O request is to be issued from the DBMS 118 (Yes in Step 720), the DB information acquiring program 122 acquires information on the I/O request (Step 722). The thus acquired information on the I/O request contains the identifier of the DBMS 118 that is to issue the I/O request, the identifiers of the processed query and scan, the identifier of the schema of the access destination based on the I/O request, and the location information of the access destination.

Then, based on the acquired information and the performance information 123, the DB information acquiring program 122 creates the DB processing execution information 630, and transmits the DB processing execution information 630 to the manager program 124 (Step 724).

After Step 724 ends, the processing advances to Step 726.

If it is judged in Step 720 that the I/O request is not to be issued from the DBMS 118, the processing advances to Step 726 without executing Steps 722 and 724.

Subsequently, the DB information acquiring program 122 judges whether or not the DBMS 118 has terminated the execution of the query (Step 726).

If the DBMS 118 terminates the execution of the query (Yes in Step 726), the DB information acquiring program 122 acquires the information relating to the terminated query from the DBMS 118 (Step 728). Then, based on the acquired information, the DB information acquiring program 122 creates the DB processing termination information 650, and transmits the DB processing termination information 650 to the manager program 124 (Step 730). Subsequently, the manager program 124 terminates the performance monitoring (Step 732).

After Step 732 ends, the processing returns to Step 704.

If it is judged in Step 726 that the DBMS 118 has not terminated the execution of the query, the processing returns to Step 704 without executing Steps 728, 730, and 732.

The above description has been made of the example of the procedure of the DB information acquisition/transmission processing. It should be noted that when the DBMS 118 receives a plurality of queries, the above-mentioned processing is performed on each of the plurality of queries.

Various methods can be employed as a method of allowing the DB information acquiring program 122 to detect "Yes" in Steps 704, 706, 712, 720, and 726. To be specific, for example, the DBMS 118 may be provided therein with an interface for notifying the DB information acquiring program 122 of the information at the following timings (1) to (5). In this case, the DB information acquiring program 122 can detect "Yes" in each step through the interface.

(1) After the activation of the DBMS. In this case, for example, the DBMS 118 transmits the notification of the activation to the DB information acquiring program 122 at the same time as the activation.

(2) At the time of a change of the DB. In this case, for example, the DBMS 118 transmits the notification of the change of the DB to the DB information acquiring program 122 at the same time as the change.

(3) At the time of reception of a query. In this case, for example, the DBMS 118 transmits information relating to the query plan of the received query to the DB information acquiring program 122 at the same time as the creation of the query plan.

(4) At the time of issuance of an access request from the DBMS. In this case, for example, the DBMS 118 transmits information relating to the access destination to the DB information acquiring program 122 at the same time as the issuance of the access request.

(5) At the time of termination of a query. In this case, for example, the DBMS 118 transmits information relating to the terminated query to the DB information acquiring program 122 at the same time as the termination of the processing of the query.

Next, description will be made of an example of a procedure of the power consumption reduction processing. It should be noted that the prefetch processing executed by the manager program 124 is described in JP 2005-258735 A as described above, and therefore description thereof will be omitted.

Figure 8A:
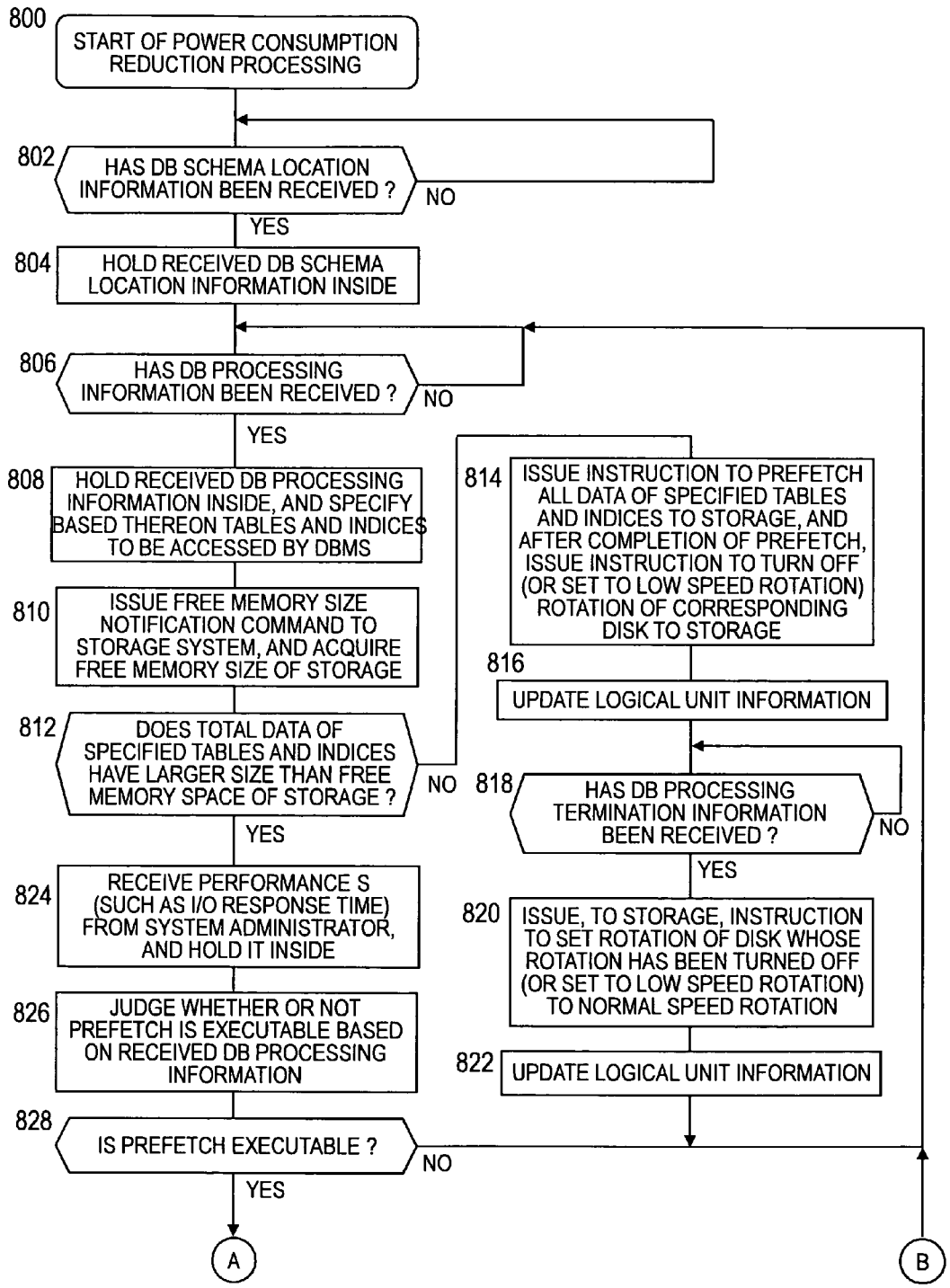
FIGS. 8A and 8B are flowcharts showing an example of a procedure of a power consumption reduction processing according to the embodiment of this invention.
Figure 8B:
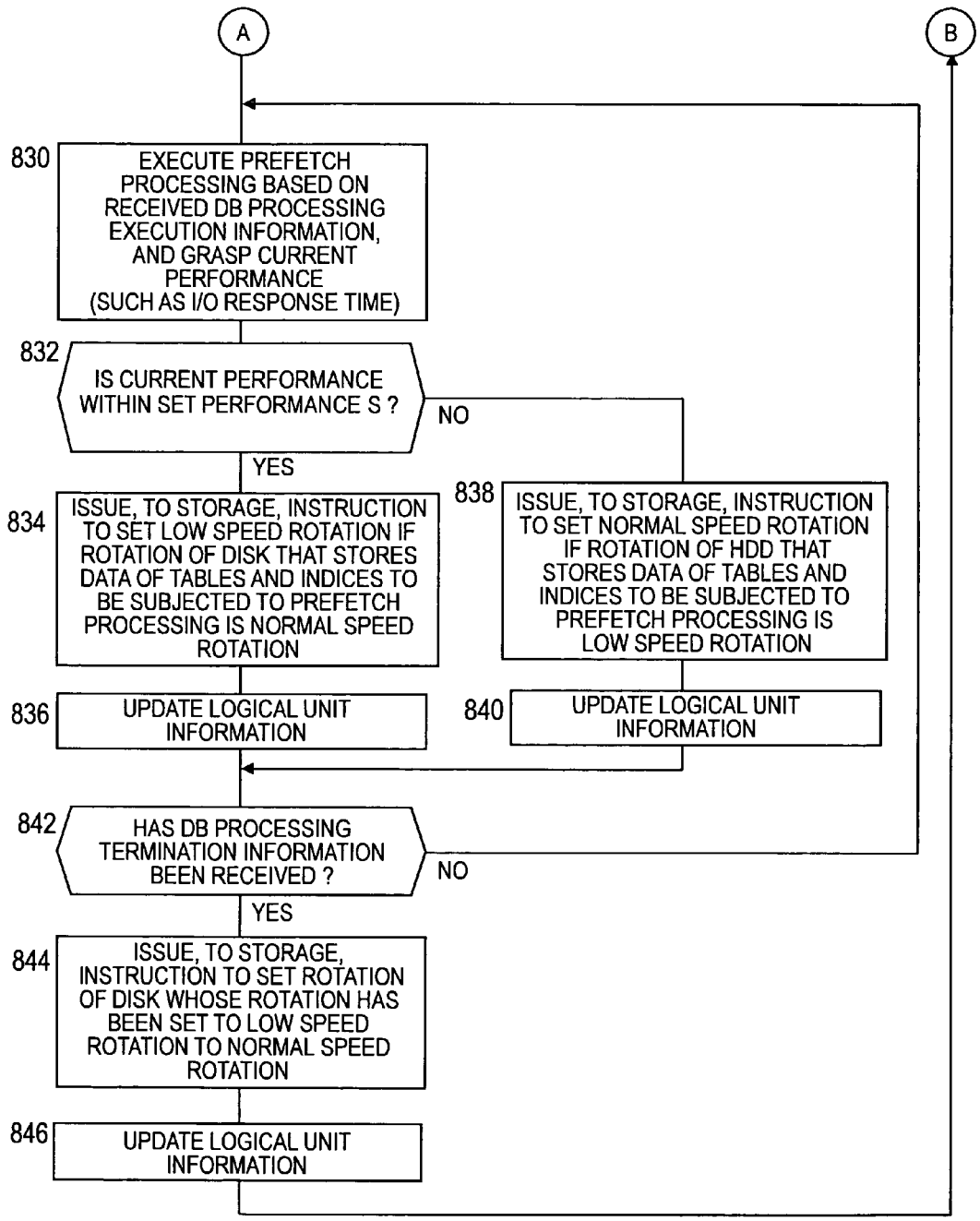

FIGS. 8A and 8B are flowcharts showing the example of the procedure of the power consumption reduction processing according to the embodiment of this invention.

The system administrator activates the manager program 124, and starts the power consumption reduction processing (Step 800). It should be noted that in this embodiment, the manager program 124 must be activated earlier than the above-mentioned DB information acquiring program 122 except in case where the order of the procedure of acquiring the information is changed. In addition, in an initial state, all of the disks 152 of the storage system 140 are rotating in the normal speed rotation.

The manager program 124 judges whether or not the DB schema location information 500 has been received from the DB information acquiring program 122 (Step 802). If the DB schema location information 500 has not been received (No in Step 802), the manager program 124 repeats the judgment of Step 802 until the reception. If the DB schema location information 500 has been received from the DB information acquiring program 122 (Yes in Step 802), the manager program 124 holds therein the received DB schema location information 500 as a portion of the DB processing management information 126 (Step 804).

Subsequently, the manager program 124 judges whether or not the DB processing information 520 has been received from the DB information acquiring program 122 (Step 806). The DB processing information 520 is transmitted by the DB information acquiring program 122 that has received the query (refer to Step 716 of FIG. 7). If the DB processing information 520 has not been received (No in Step 806), the manager program 124 repeats the judgment of Step 806 until the reception.

If the DB processing information 520 has been received from the DB information acquiring program 122 (Yes in Step 806), the manager program 124 holds therein the received DB processing information 520 as a portion of the DB processing management information 126. Further, the manager program 124 references the DB processing information 520 to specify the DB schemata (such as tables and indices) to be accessed by the DBMS (Step 808). The DB schemata (in other words, all the DB schemata registered in the DB processing information 520) thus specified are to be accessed by the DBMS 118 in order to process the current query (in other words, query received by the DB information acquiring program 122 in Step 716 of FIG. 7).

Subsequently, the manager program 124 issues the free memory size notification command to the storage system 140, and waits for the reception of the free memory size notification response 600 to be transmitted from the storage system 140 (Step 810).

Subsequently, the manager program 124 references the DB schema location information 500 to specify the total data amount of the DB schemata specified in Step 808. To be specific, the manager program 124 calculates the total data amount by summing up the values of the schema sizes registered in the fields 508 corresponding to the DB schemata specified in Step 808 in the entries of the DB schema location information 500. Then, the manager program 124 compares the calculated total data amount with the free memory size the storage system 140 acquired in Step 810 (Step 812).

If the total data amount of the DB schemata specified in Step 808 is smaller than the free memory size of the storage system 140 (No in Step 812), the total data of the DB schemata specified in Step 808 can be stored in the free space of the memory 150. In this case, the manager program 124 issues to the storage system 140 an instruction to prefetch the total data of the DB schemata specified in Step 808 into the memory 150 of the storage system 140, and waits for a completion notification of the prefetch to be transmitted from the storage system 140. Upon reception of the completion notification of the prefetch from the storage system 140, the manager program 124 creates the disk control command 610 to stop (or set to low speed rotation) the rotation of the disk 152 corresponding to the logical unit that stores the DB schemata specified in Step 808, and issues the disk control command 610 to the storage system 140 (Step 814).

The prefetch instruction issued in Step 814 contains information for designating a location where data to be prefetched (in other words, data of the DB schemata specified in Step 808) is stored. To be specific, the prefetch instruction contains the values of the location destination logical unit number 512 and the location destination head logical address 514 which correspond to the DB schemata specified in Step 808.

The control program 154 of the storage system 140, which has received the prefetch instruction, reads out the data from the location designated in the prefetch instruction. To be specific, the control program 154 references the storage area management information 156 to convert the logical unit number and logical block address contained in the prefetch instruction into the physical disk number and physical block address. Then, the control program 154 reads out the data from the storage area of the disk 152 indicated by the physical disk number and physical block address that have been obtained by the conversion. After that, the control program 154 writes the read out data into the memory 150.

After ending writing the data into the memory 150, the control program 154 transmits the completion notification of the prefetch.

Registered as the logical unit number 612 of the disk control command 610 issued in Step 814 are the numbers given to the logical unit that store the DB schemata specified in Step 808 (in other words, location destination logical unit numbers 512 corresponding to the specified DB schemata).

The control program 154 of the storage system 140 that has received the disk control command 610 issued by the manager program 124 in Step 814 specifies the disk 152 corresponding to the logical unit designated in the disk control command 610.

For example, as shown in FIG. 6B, if "0" and "stopped" are registered as the logical unit number 612 and control content 614 of the disk control command 610, the control program 154 specifies the disk 152 corresponding to the logical unit assigned with the logical unit number "0" (in other words, disk 152 in which the data written into the logical unit is finally stored).

To be specific, the control program 154 references the storage area management information 156. For example, if the storage area management information 156 shown in FIG. 2A is referenced, at least "0", "1", and "2" are registered as the physical disk numbers 204 corresponding to the value "0" of the logical unit number 200. This means that the disks 152 assigned with the physical disk numbers "0", "1", and "2" correspond to the logical unit assigned with the logical unit number "0".

Further, according to the disk control command 610, the control program 154 controls the rotation of the specified disk 152. For example, the control program 154 stops the rotations of the disks 152 assigned with the physical disk numbers "0", "1", and "2". In this case, the control program 154 updates the disk rotation management information 158. For example, the control program 154 sets the value of the rotation status information 222 corresponding to the physical disk numbers "0", "1", and "2" to "stopped".

Subsequently, the manager program 124 updates the field 544 of the logical unit status information 128 corresponding to the logical unit whose rotation has been stopped (or set to low speed rotation) into "stopped" (or "low") (Step 816).

Then, the manager program 124 judges whether or not the DB processing termination information 650 has been received (Step 818). If the DB processing termination information 650 has not been received (No in Step 818), the manager program 124 repeats the judgment of Step 818 until the DB processing termination information 650 is received.

Upon reception of the DB processing termination information 650 from the DB information acquiring program 122 (Yes in Step 818), the manager program 124 creates the disk control command 610 to set the rotation of the disk 152 corresponding to the logical unit whose rotation has been stopped (or set to low speed rotation) to the normal speed rotation, and issues the disk control command 610 to the storage system 140 (Step 820).

The control program 154 of the storage system 140 that has received the disk control command 610 issued by the manager program 124 in Step 820 specifies the disk 152 corresponding to the logical unit designated in the disk control command 610. This specification is executed similarly to Step 814.

Further, according to the disk control command 610, the control program 154 returns the rotation of the specified disk 152 to "normal".

Subsequently, the manager program 124 updates the field 544 of the logical unit status information 128 corresponding to the logical unit set in the normal speed rotation in Step 820 into "normal" (Step 822). Then, the manager program 124 returns to the loop of Step 806 to wait for the reception of the DB processing information.

It should be noted that when the data that has been read out from the disk 152 of the storage system 140 into the memory 150 is updated, the manager program 124 reflects the update on the data (in other words, data of a read source of the updated data) on the disk 152 corresponding to the updated data.

In the above-mentioned steps, the data to be accessed by the DBMS 118 (in other words, data that can be accessed by the DBMS 118) is previously read out from the disk 152 of the storage system 140, and written into the memory 150. After that, if the DBMS 118 accesses the data, the access to the memory 150 is executed instead of the access to the disk 152. Accordingly, the need for the access to the disk 152 that stores the original data is eliminated, so the rotation of the disk 152 that stores the original data can be stopped (or set to low speed rotation). As a result, it is possible to reduce the power consumption of the storage system 140.

However, the amount of data that can be accessed by the DBMS 118 is larger than the free memory size of the storage system 140, all of the data read out from the disk 152 cannot be written into the memory 150. In this case, the following processing is executed to realize reduction in the power consumption of the storage system 140 as much as possible.

The total data amount of the DB schemata specified in Step 808 is larger than the free memory size of the storage system 140 (Yes in Step 812), the manager program 124 receives a performance requirement (hereinafter, referred to as "Performance S". In this embodiment, I/O response time) from the system administrator, and holds the performance requirement as the performance requirement information 129 (Step 824).

The manager program 124 references the DB processing information 520 held therein in Step 808 to judge whether or not the query can execute the prefetch (in other words, whether or not the effect of improvement of the access performance can be obtained by executing the prefetch) (Step 826). This judgment may be executed by any method. For example, the manager program 124 can execute this judgment by the known technique described in JP 2005-258735 A.

If it is judged in Step 826 that the prefetch cannot be executed (in other words, the access performance cannot be improved by executing the prefetch) (No in Step 828), the disk rpm cannot be set to be low without deteriorating the access performance. In this case, the control of the disk rpm (in other words, lowering the disk rpm) is not executed, and the processing returns to the loop of Step 806 to wait for the reception of the DB processing information.

If it is judged in Step 826 that the prefetch can be executed (Yes in Step 828), the improvement of the access performance due to the prefetch can compensate the deterioration of the access performance due to lowering of the disk rpm. In this case, the manager program 124 executes the prefetch processing based on the DB processing execution information 630 transmitted from the DB information acquiring program 122. Further, the manager program 124 references the I/O response time 642 within the DB processing execution information 630 to acquire the current performance conditions (I/O response time) (Step 830).

It should be noted that the data prefetched in Step 830 is a portion of the data contained in the DB schemata specified in Step 808. The prefetched data may be specified by the method described in JP 2005-258735 A.

The manager program 124 judges whether or not the current performance (I/O response time) acquired in Step 830 is equal to or larger than Performance S (I/O response time) held in the set performance requirement information 129 (Step 832). For example, if the I/O response time acquired in Step 830 is equal to or smaller than the I/O response time held as Performance S, the current performance acquired in Step 830 is judged to be equal to or larger than Performance S.

It should be noted that this embodiment shows an example where the I/O response times are compared with each other as the performances. However, any information items that indicate the performances other than the I/O response times (for example, the number of I/O operations per second (IOPS) or data throughput) may be compared with each other. To be specific, if the value of IOPS acquired in Step 830 is equal to or larger than the value of IOPS held as Performance S, the current performance acquired in Step 830 may be judged to be equal to or larger than Performance S.

If the current performance is equal to or larger than Performance S in Step 832 (Yes in Step 832), the manager program 124 references the logical unit status information 128 to judge whether or not the rotation status of the disk of the logical unit that stores the data of the table or index to be prefetched is the normal speed rotation. If the rotation status is the normal speed rotation, the manager program 124 creates the disk control command 610 to set the rotation of the disk of the logical unit to the low speed rotation, and transmits the disk control command 610 to the storage system 140 (Step 834).

It should be noted that the logical unit that stores the data of the table or index to be prefetched is specified similarly to Step 814. Registered as the logical unit number 612 of the disk control command 610 transmitted in Step 834 is the specified logical unit number, and "low" is registered as the control content 614.

The control program 154 of the storage system 140 that has received the disk control command 610 issued by the manager program 124 in Step 834 specifies the disk 152 corresponding to the logical unit designated in the disk control command 610. This specification is executed similarly to Step 814.

Further, according to the disk control command 610, the control program 154 controls the rotation of the specified disk 152. For example, if the disks 152 assigned with the physical disk numbers "0", "1", and "2" are specified, the control program 154 sets the rotations of those disks 152 to be low.

It should be noted that if the rotations of those disks 152 have already been set to be low, the manager program 124 may transmit the disk control command 610 to set the rpm of those disks 152 to be lower. In this case, the control program 154 sets the rotations of those disks 152 to be lower.

Subsequently, the manager program 124 updates the field 544 of the logical unit status information 128 corresponding to the logical unit into "low" (Step 836).

If the current performance is not equal to or larger than Performance S in Step 832 (No in Step 832), the manager program 124 references the logical unit status information 128 to judge whether or not the rotation status of the disk of the logical unit that stores the data of the table or index to be prefetched is the low speed rotation. If the rotation status is the low speed rotation, the manager program 124 creates the disk control command 610 to set the rotation of the disk of the logical unit to the normal speed rotation, and transmits the disk control command 610 to the storage system 140 (Step 838).

The control program 154 of the storage system 140 that has received the disk control command 610 issued by the manager program 124 in Step 838 specifies the disk 152 corresponding to the logical unit designated in the disk control command 610. This specification is executed similarly to Step 814.

Further, according to the disk control command 610, the control program 154 controls the rotation of the specified disk 152. For example, if the disks 152 assigned with the physical disk numbers "0", "1", and "2" are specified, the control program 154 returns the rotations of those disks 152 to the normal rpm.

Alternatively, the control program 154 may set the rpm of those disks 152 to be higher than the currently set rpm and lower than the normal rpm.

Subsequently, the manager program 124 updates the field 544 of the logical unit status information 128 corresponding to the logical unit into "normal" (Step 840).

After execution of Step 836 or 840, the manager program 124 judges whether or not the DB processing termination information 650 has been received from the DB information acquiring program 122 (Step 842).

If the DB processing termination information 650 has not been received (No in Step 842), the manager program 124 repeats Step 830 and the subsequent steps.

If the DB processing termination information 650 has been received (Yes in Step 842), the manager program 124 references the logical unit status information 128 to judge whether or not the disk of the logical unit that stores the data of the table or index to be prefetched is in the low speed rotation status. As a result, if the rotation status is the low speed rotation, the manager program 124 creates the disk control command 610 to set the rotation of the disk of the logical unit to the normal speed rotation, and transmits the disk control command 610 to the storage system 140 (Step 844). Further, the manager program 124 updates the field 544 of the logical unit status information 128 corresponding to the logical unit into "normal" (Step 846), and the processing returns to the loop of Step 806 to wait for the reception of the DB processing information.

According to the above-mentioned steps, even if all of the data cannot be written into the memory 150 with the amount of data that can be accessed by the DBMS 118 being larger than the free memory size of the storage system 140, it is possible to reduce the power consumption of the storage system 140 by setting the rotation of the disk 152 to be low. By executing the prefetch of the data to be accessed by the DBMS 118 (in other words, at least one portion of the data that can be accessed by the DBMS 118), it is possible to improve the access performance. The improvement of the access performance due to this prefetch can cancel the deterioration of the performance due to the low speed rotation of the disk. The system administrator can arbitrarily set the necessary performance as the performance requirement (Performance S). By setting the rotation of the disk 152 of the storage system 140 to be as low as possible within a range that satisfies the performance requirement, it is possible to reduce the power consumption of the storage system 140 while maintaining the necessary performance.

As described above in the embodiment of this invention, in the system in which the DB server with the DBMS operating thereon is coupled with the storage system that stores the data of the DB through the network, the manager program is executed on the DB server, another server coupled to the same network, or the storage system. The manager program executes the following processings based on the information relating to a storage location on the storage system of the DB schema managed by the DBMS, the information relating to the DB processing executed by the DBMS, and the information relating to the access to the data of the DB made by the DBMS upon execution of the DB processing.

The manager program first specifies the DB schemata (in other words, tables, indices, and the like) to be accessed in the DB processing executed by the DBMS, and calculates the total data amount of the DB schemata. If the calculated total data amount is smaller than the free memory size of the storage system, the manager program issues a command to prefetch all of the target data to the storage system. After completion of the prefetch into the memory of the storage system, the manager program issues an instruction to stop (or set to low speed rotation) the rotation of the disk that stores the target data to the storage system. According to the instruction, the storage system controls the rotation of the corresponding disk.

If the total data amount of the DB schemata to be accessed in the DB processing executed by the DBMS is larger than the free memory size of the storage system, the manager program executes the prefetch processing described in JP 2005-258735 A. Further, the manager program monitors the performance of the DB server, and issues an instruction to set the rotation of the disk that stores the target data to the low speed rotation within the set performance requirement to the storage system. If the performance of the DB server is lower than the set performance requirement during the low speed rotation of the corresponding disk, the manager program issues an instruction to set the rotation of the corresponding disk to the normal speed rotation to the storage system. According to those instructions, the storage system controls the rotation of the corresponding disk.

As a result, the power consumption of the storage system can be reduced within a range that maintains the necessary performance.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising a computer and a storage system coupled to the computer via a network,
the computer comprising: a first interface coupled to the network; a first processor coupled to the first interface; and a first memory coupled to the first processor,
the computer running as a database server by executing a database management system stored in the first memory by the first processor,
the storage system comprising: a plurality of disk drives for storing data written by the computer; and a controller for controlling the plurality of disk drives,
the controller comprising: a second interface coupled to the network; a second processor coupled to the second interface; and a second memory coupled to the second processor,
at least one of the plurality of disk drives storing data of a database schema written by the computer,
the computer system further comprising a management module, wherein:
the management module is configured to:
specify the database schema to be accessed based on a query received by the computer;
read out at least a portion of the data of the specified database schema from the disk drive;
transmit an instruction to write the read-out data into the second memory to the storage system;
transmit a control instruction to the storage system, the control instruction for controlling a revolutions per minute (RPM) of the disk drive that stores the data of the specified database schema;
if a total data amount of the data of the specified database schema is larger than a free memory size of the second memory, read out a portion of the data of the specified database schema from the disk drive;
write the read-out data into the second memory;
acquire a value representing a performance of the computer, wherein the performance includes any one of: an input/output I/O response time, a number of I/O operations per second, or a data throughput value;
transmit the control instruction to the storage system, the control instruction for lowering the RPM of the disk drive that stores the data of the specified database schema if the acquired value representing the performance indicates a performance higher than a predetermined threshold;
acquire a second value representing the performance of the computer after transmitting the control instruction to the storage system for lowering the RPM of the disk drive;
transmit a second control instruction to the storage system, the second control instruction for further lowering the RPM of the disk drive that stores the data of the specified database schema if the second acquired value representing the performance indicates a performance higher than the predetermined threshold;
transmit a third control instruction to the storage system, the third control instruction for raising the RPM of the disk drive that stores the data of the specified database schema if the acquired value representing the performance indicates a performance lower than the predetermined threshold;
the controller is configured to:
specify the disk drive whose RPM is to be controlled according to any one of: the control instruction, the second control instruction, or the third control instruction; and
execute any one of: lowering of the RPM of the specified disk drive, raising the RPM of the specified disk drive, or stopping rotation of the specified disk drive.

2. The computer system according to claim 1, wherein:
the management module is configured to:
- if a total data amount of the data of the specified database schema is not larger than a free memory size of the second memory, read out all of the data of the specified database schema from the disk drive;
- write the read-out data into the second memory; and
- transmit the control instruction to the storage system, the control instruction for stopping the rotation of the disk drive that stores the data of the specified database schema.

3. The computer system according to claim 2, wherein:
the management module is configured to transmit a free memory size notification command to the storage system; and
the controller is further configured to transmit, to the management module, a value representing a free memory size of the second memory according to the free memory size notification command.

4. The computer system according to claim 1, wherein the management module is implemented by executing, by the first processor, a program stored in the first memory.

5. The computer system according to claim 1, wherein the management module is implemented by executing, by the second processor, a program stored in the second memory.

6. The computer system according to claim 1, further comprising a second computer coupled to the computer and the storage system via the network, wherein:
the second computer comprises:
- a third interface coupled to the network;
- a third processor coupled to the third interface; and
- a third memory coupled to the third processor; and
the management module is implemented by executing, by the third processor, a program stored in the third memory.

7. A method of controlling a computer system including a computer and a storage system coupled to the computer via a network,
the computer including: a first interface coupled to the network; a first processor coupled to the first interface; and a first memory coupled to the first processor,
the computer running as a database server by executing a database management system stored in the first memory by the first processor,
the storage system including: a plurality of disk drives for storing data written by the computer; and a controller for controlling the plurality of disk drives,
the controller including: a second interface coupled to the network; a second processor coupled to the second interface; and a second memory coupled to the second processor,
at least one of the plurality of disk drives storing data of a database schema written by the computer,
the method comprising:
- acquiring a value representing a performance of the computer, wherein the performance includes any one of: an input/output (I/O) response time, a number of I/O operations per second, or a data throughput value;
- specifying the database schema to be accessed based on a query received by the computer;
- reading out at least a portion of the data of the specified database schema from the disk drive, wherein if a total data amount of the data of the specified database schema is larger than a free memory size of the second memory, reading out a portion of the data of the specified database schema from the disk drive;
- transmitting an instruction to write the read-out data into the second memory to the storage system;
- transmitting a control instruction to the storage system, the control instruction for controlling a revolutions per minute (RPM) of the disk drive that stores the data of the specified database schema, wherein if the acquired value representing the performance indicates a performance higher than a predetermined threshold, the control instruction is for lowering the RPM of the disk drive that stores the data of the specified database schema;
- acquiring a second value representing the performance of the computer after transmitting the control instruction to the storage system, the control instruction for lowering the RPM of the disk drive;
- transmitting a second control instruction to the storage system, the second control instruction for further lowering the RPM of the disk drive that stores the data of the specified database schema if the second acquired value representing the performance indicates a performance higher than the redetermined threshold;
- transmitting a third control instruction to the storage system, the third control instruction for raising the RPM of the disk drive that stores the data of the specified database schema if the acquired value representing the performance indicates a performance lower than the predetermined threshold;
- specifying the disk drive whose RPM is to be controlled according to any one of: the control instruction, the second control instruction, or the third control instruction;
- executing any one of: lowering of the RPM of the specified disk drive, raising the RPM of the specified disk drive, or stopping rotation of the specified disk drive.

8. The method according to claim 7, wherein:
if a total data amount of the data of the specified database schema is not larger than a free memory size of the second memory, the reading out includes reading out all of the data of the specified database schema from the disk drive; and
the transmitting includes transmitting the control instruction to the storage system, the control instruction for stopping the rotation of the disk drive that stores the data of the specified database schema.

9. The method according to claim 8, further comprising:
transmitting a free memory size notification command to the storage system; and
transmitting, by the storage system, a value representing a free memory size of the second memory according to the free memory size notification command.

* * * * *